United States Patent
Manula et al.

(10) Patent No.: US 7,424,566 B2
(45) Date of Patent: Sep. 9, 2008

(54) METHOD, SYSTEM, AND APPARATUS FOR DYNAMIC BUFFER SPACE ALLOCATION

(75) Inventors: Brian Edward Manula, Oslo (NO); Magne Vigulf Sandven, Ski (NO); Ali Bozkaya, Oslo (NO)

(73) Assignee: Sun Microsystems, Inc., Santa Clara, CA (US)

( * ) Notice: Subject to any disclaimer, the term of this patent is extended or adjusted under 35 U.S.C. 154(b) by 104 days.

(21) Appl. No.: 11/280,152

(22) Filed: Nov. 16, 2005

(65) Prior Publication Data

US 2007/0112995 A1     May 17, 2007

(51) Int. Cl.
*G06F 13/36* (2006.01)
(52) U.S. Cl. .................................. 710/310; 710/57
(58) Field of Classification Search ......... 710/309–317, 710/52, 58–61, 29–35; 711/147, 150, 168, 711/170, 166
See application file for complete search history.

(56) References Cited

U.S. PATENT DOCUMENTS

| | | | |
|---|---|---|---|
| 5,802,055 A * | 9/1998 | Krein et al. .................. | 370/402 |
| 6,243,781 B1 * | 6/2001 | Gandhi et al. ................ | 710/313 |
| 6,820,091 B2 * | 11/2004 | Weigelt ....................... | 707/102 |
| 6,862,673 B2 * | 3/2005 | Lee et al. ..................... | 711/169 |
| 6,931,472 B1 * | 8/2005 | Kondo et al. ................. | 710/310 |
| 7,191,255 B2 * | 3/2007 | Wong et al. ..................... | 710/5 |
| 2002/0138790 A1 * | 9/2002 | Nishtala ....................... | 714/43 |
| 2004/0019729 A1 * | 1/2004 | Kelley et al. ................. | 710/306 |
| 2005/0125590 A1 * | 6/2005 | Li et al. ....................... | 710/317 |

* cited by examiner

*Primary Examiner*—Raymond N Phan
(74) *Attorney, Agent, or Firm*—Park, Vaughan & Fleming LLP (57) ABSTRACT

An interconnect apparatus provides for the buffering of information in respective transaction buffers according to transaction type. An additional buffer is dynamically assignable to one of the transaction buffers where additional capacity is required by that transaction buffer.

18 Claims, 10 Drawing Sheets

| Byte Offset (Hex) | | | | |
|---|---|---|---|---|
| 31 | | | | 0 |
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Register 0 | | | | 10 |
| Base Address Register 1 | | | | 14 |
| Secondary Latency Timer | Subordinate Bus Number | Secondary Bus Number | Primary Bus Number | 18 |
| Secondary Status | | I/O Limit | I/O Base | 1C |
| Memory Limit | | Memory Base | | 20 |
| Prefetchable Memory Limit | | Prefetchable Memory Base | | 24 |
| Prefetchable Base Upper 32 Bits | | | | 28 |
| Prefetchable Base Lower 32 Bits | | | | 2C |
| I/O Limit Upper 16 Bits | | I/O Limit Lower 16 Bits | | 30 |
| Reserved | | | Capabilites Pointer | 34 |
| Expansion ROM Base Address | | | | 38 |
| Bridge Control | | Interrupt Pin | Interrupt Line | 3C |

Fig. 6

| Byte Offset (Hex) | | | |
|---|---|---|---|
| 31 | | | 0 |
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Registers | | | | 10 |
| | | | | 14 |
| | | | | 18 |
| | | | | 1C |
| | | | | 20 |
| | | | | 24 |
| Cardbus CIS Pointer | | | | 28 |
| Subsystem ID | | Subsystem Vendor ID | | 2C |
| Expansion ROM Base Address | | | | 30 |
| Reserved | | | Capabilites Pointer | 34 |
| Reserved | | | | 38 |
| Max_Lat | Min_Gnt | Interrupt Pin | Interrupt Line | 3C |

METHOD, SYSTEM, AND APPARATUS FOR DYNAMIC BUFFER SPACE ALLOCATION

RELATED APPLICATIONS

This application is related to U.S. patent application Ser. Nos. 11/280,155, entitled "Apparatus and Method for Implementing a Communications Port" (SUN05-0508), 11/280,148, entitled "Buffer for Output and Speed Matching" (SUN05-0533) and 11/280,154, entitled "Dynamic Retry Buffer" (SUN05-0820), all of which were filed Nov. 16, 2005.

BACKGROUND

The present invention relates to communication apparatus and in particular, but not exclusively, to a PCI Express interconnect apparatus.

In many computer environments, a fast and flexible interconnect system can be desirable to provide connectivity to devices capable of high levels of data throughput. In the fields of data transfer between devices in a computing environment, PCI Express (PCI-E) can be used to provide connectivity between a host and one or more client devices or endpoints. PCI Express is becoming a de-facto I/O interconnect for servers and desktop computers. PCI Express allows physical system decoupling (CPU <-> I/O) through high-speed serial I/O. The PCI Express Base Specification 1.0 sets out behavior requirements of devices using the PCI Express interconnect standard. According to the Specification, PCI Express is a host to endpoint protocol where each endpoint connects to a host and is accessible by the host. PCI Express imposes a stringent tree structure relationship between I/O Devices and a Root Complex.

An interconnect apparatus, for example a switch, will need to process and transmit large volumes of transaction packets. These transaction packets can be of different types that are buffered separately. Buffers are typically implemented using hardware in which the area available ("real estate") on, for example, an integrated circuit such as an application specific integrated circuit (ASIC) is at a premium. It is therefore desirable to implement a buffer in a manner which requires a minimum of real estate.

SUMMARY OF THE INVENTION

Aspects of the invention are defined in the appended claims.

An embodiment of the invention can provide an interconnect apparatus that enables the buffering of information in respective transaction buffers according to transaction type. An additional buffer is dynamically assignable to one of the transaction buffers where additional capacity is required by that transaction buffer.

An example embodiment can thereby be configured to accommodate particular operating conditions where a high buffer capacity is required, without having to configure each buffer to accommodate that capacity. In this manner, the buffers can be implemented in a space efficient manner within an integrated circuit.

Although various aspects of the invention are set out in the accompanying independent claims, other aspects of the invention include any combination of features from the described embodiments and/or the accompanying dependent claims, and not solely the combinations set out in the accompanying claims.

BRIEF DESCRIPTION OF THE FIGURES

Specific embodiments of the present invention will now be described by way of example only with reference to the accompanying Figures in which.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DESCRIPTION OF PARTICULAR EMBODIMENTS

Embodiments of the invention are described in the following with reference to an example of an interconnect apparatus for supporting PCI Express.

The PCI Express 1.0 standard set out in the PCI Express Base Specification 1.0 available from the PCI (Peripheral Component Interconnect) Special Interest Group (www.pcisig.com) is one example of a computer interconnect standard. The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are power management, Quality of Service (QoS), hot-plug/hot-swap support, data integrity, and error handling. PCI Express is also backwards compatible with the software models used to describe PCI, such that PCI Express hardware can be detected and configured using PCI system configuration software implementations with no modifications.

Figure 1:
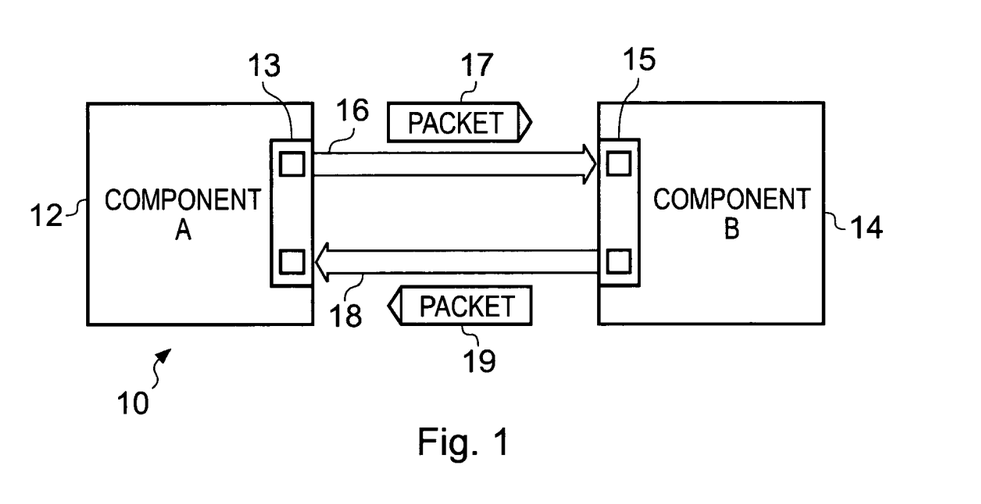
FIG. 1 is a schematic representation of a PCI Express connection.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple lanes denoted by ×N where N may be any of the supported link widths. An ×8 link represents an aggregate bandwidth of 20 Gigabits/second of raw bandwidth in each direction. This base specification 1.0 describes operations for ×1, ×2, ×4, ×8, ×12, ×16, and ×32 lane widths. According to the specification only symmetrical links are permitted, such that a link includes the same number of lanes in each direction.

Figure 2:
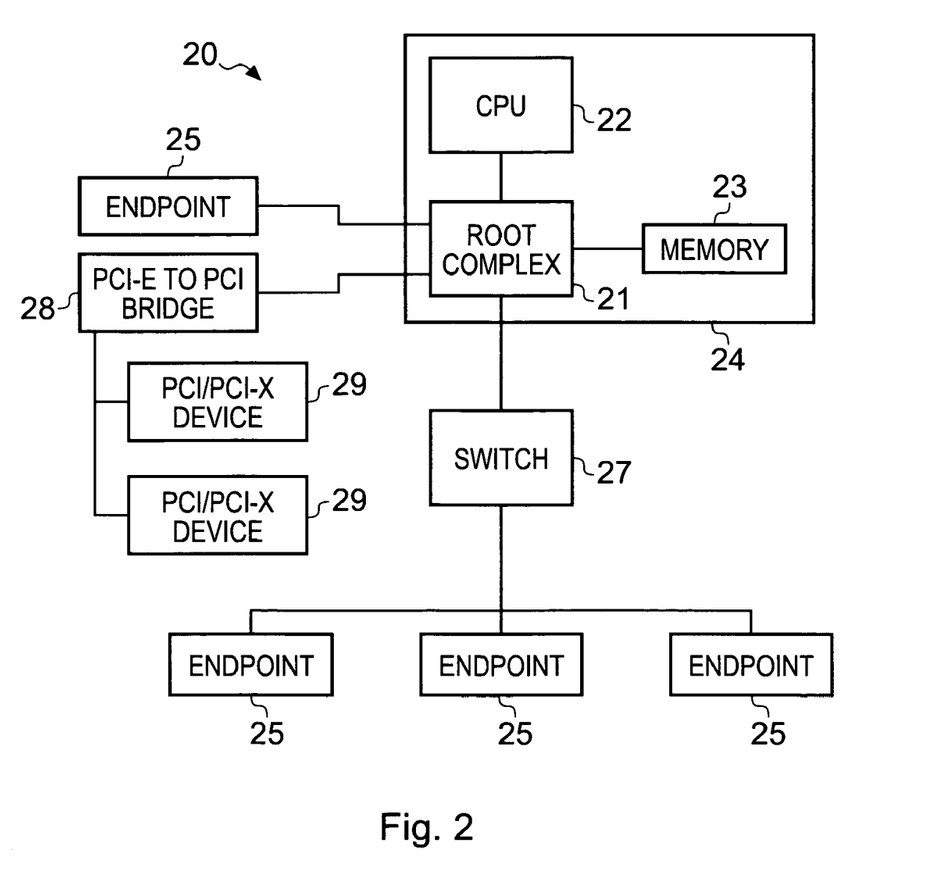
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express links. The root complex 21 can be connected to a CPU 22 and memory 23 subsystem which requires access to the I/O facilitated by the PCI Express fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or Host CPU). Examples of endpoints include: a PCI Express attached graphics controller, a PCI Express-USB host controller, and a PCI Express attached network interface such as an Ethernet MAC/PHY or InfiniBand Host Channel Adapter (HCA).

Figure 3:
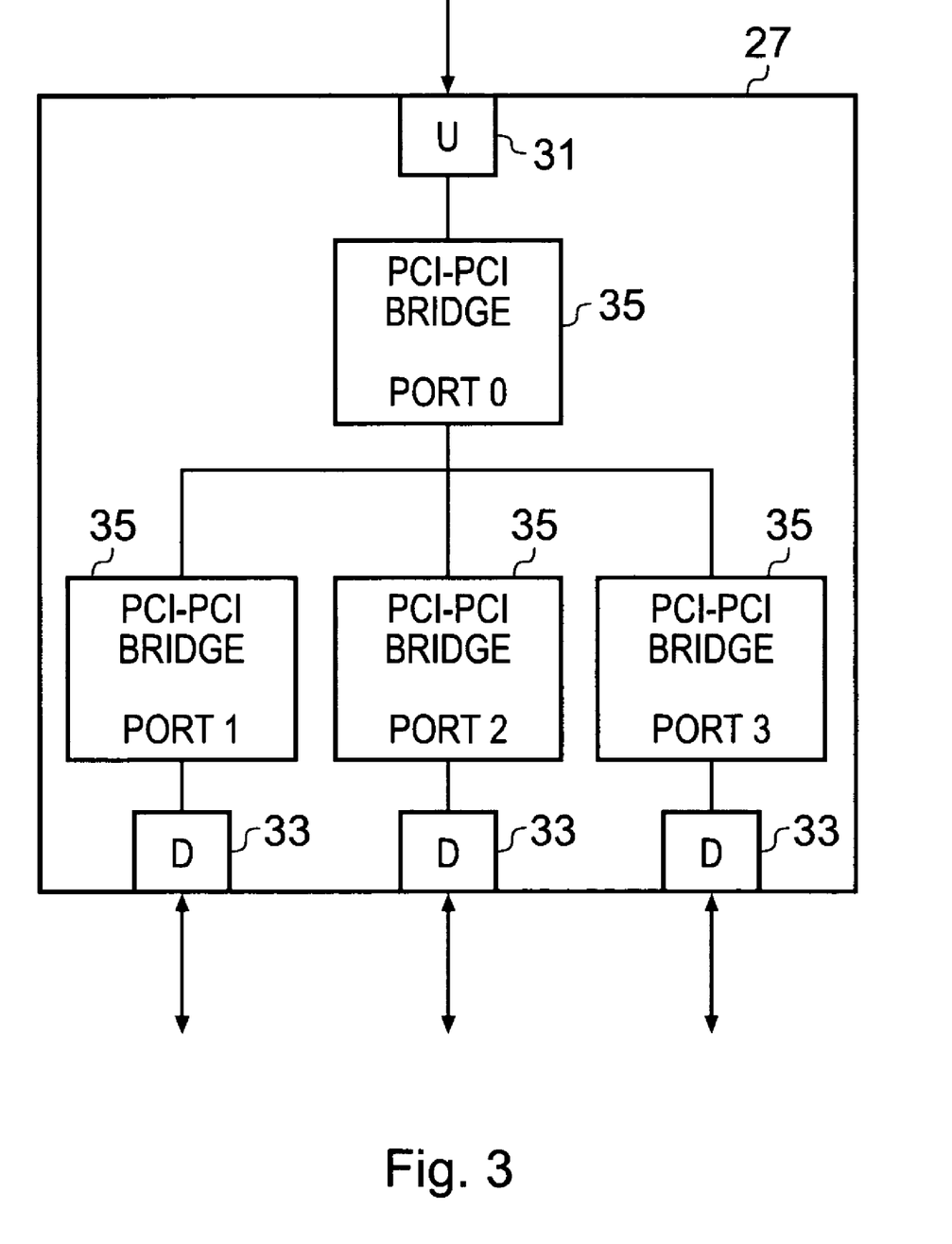
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express bridges and forward transactions using PCI bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge.

A PCI Express to PCI bridge 28 provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express link is mapped through a virtual PCI-to-PCI bridge structure and has a logical PCI bus associated with it. The virtual PCI-to-PCI bridge structure may be part of a PCI Express root complex port, a switch upstream port, or a switch downstream port. A root port is a virtual PCI-to-PCI bridge structure that originates a PCI Express hierarchy domain from a PCI Express root complex. Logical devices are mapped into configuration space such that each will respond to a particular device number.

Figure 4:
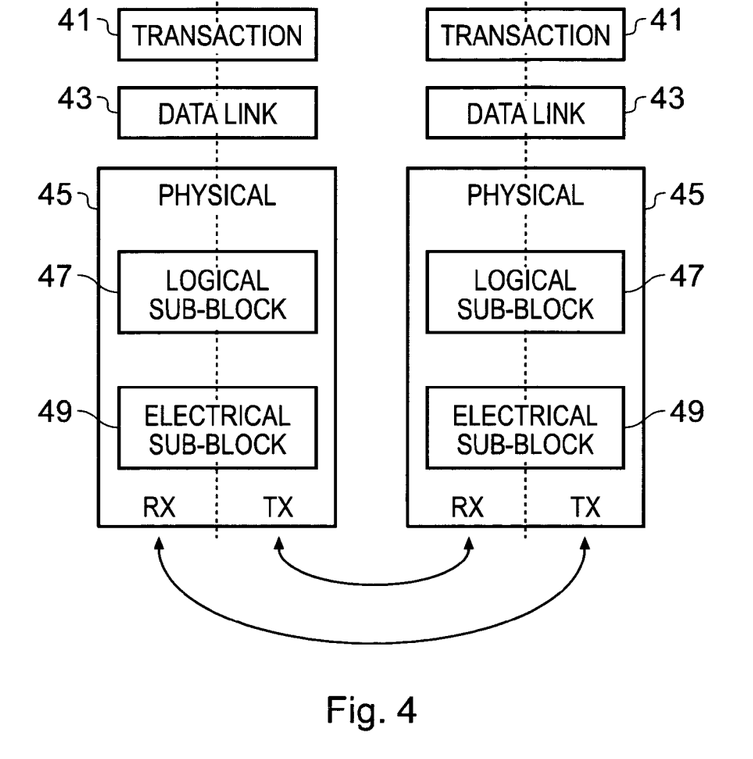
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets get transformed from their physical layer representation to the data link layer representation and finally (for transaction layer packets) to the form that can be processed by the transaction layer of the receiving device.

Figure 5:
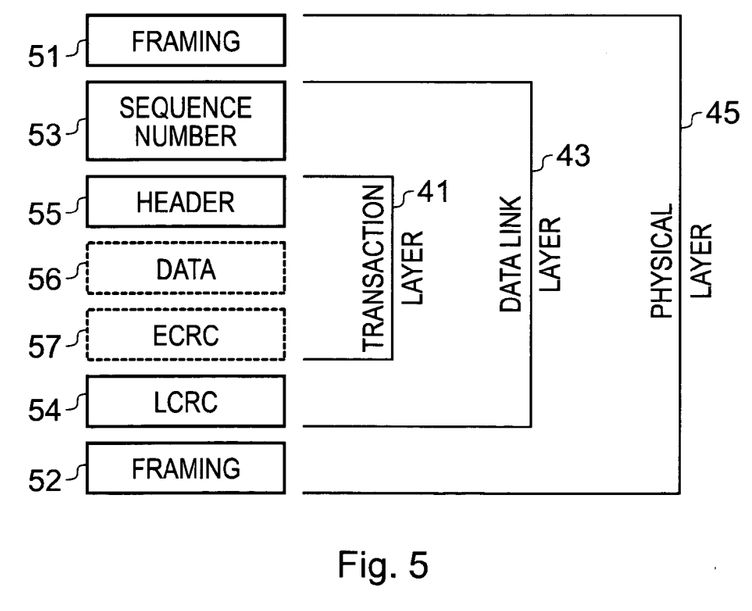
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same link) for the purpose of link management.

The upper layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The packets may also have attributes such as no Snoop and relaxed ordering.

The transaction layer supports four address spaces: the three PCI address spaces (memory, I/O, and configuration) and a message space. According to the PCI Express specification, the message space is used to support all prior sideband signals, such as interrupts, power-management requests, and so on, as in-band message transactions. PCI Express message transactions can be considered as "virtual wires" since their effect is to eliminate the wide array of sideband signals used in a conventional platform implementation.

The middle layer in the stack, the data link layer 43, serves as an intermediate stage between the transaction layer 41 and the physical layer 45. The primary responsibilities of the data link layer 41 include link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the link. The receiving data link layer 43 is responsible for checking the integrity of received TLPs and for submitting them to the transaction layer 41 for further processing. On detection of TLP error(s), this layer is responsible for requesting retransmission of TLPs until information is correctly received, or the link is determined to have failed.

The data link layer 43 also generates and consumes packets that are used for link management functions. To differentiate these packets (TLP) from those used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This layer is responsible for converting information received from the data link layer 43 into an appropriate serialized format and transmitting it across the PCI Express link at a frequency and width compatible with the device connected to the other side of the link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPs, exchanges flow control information with its complementary transaction layer 41 on the other side of the link. It is also responsible for supporting both software and hardware-initiated power management.

Initialization and configuration functions require the transaction layer 41 to store link configuration information generated by the processor or management device and store link capabilities generated by physical layer hardware negotiation of width and operational frequency.

A transaction layer's packet generation and processing services require it to: generate TLPs from device core requests; convert received request TLPs into requests for the device core; convert received completion packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the link. Transaction credit status is periodically transmitted to the remote transaction layer using transport services of the data link layer. Remote flow control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of virtual channels and traffic class. The combination of virtual channel mechanism and traffic class identification is provided to support differentiated services and QoS (Quality of Service) support for certain classes of applications. Virtual channels provide a means to support multiple independent logical data flows over given common physical resources of the link. Conceptually this involves multiplexing different data flows onto a single physical link. The traffic class is a transaction layer packet label that is transmitted unmodified end-to-end through the fabric. At every service point (e.g., switch) within the fabric, traffic class labels are used to apply appropriate servicing policies. Each traffic class label defines a unique ordering domain—no ordering guarantees are provided for packets that contain different traffic class labels.

The data link layer 43 is responsible for reliably exchanging information with its counterpart on the opposite side of the link. Accordingly, it has responsibility for initialization and power management services to: accept power state requests from the transaction layer 41 and convey them to the physical layer 45; and to convey active/reset/disconnected/power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: reset/hot-plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths>×1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link;

TLP framing information for the received byte; actual power state for the link; and link status information.

The data link to physical interface provides: byte or multi-byte wide data to be sent across the link (including a data transfer handshake mechanism and TLP and DLLP boundary information for bytes); and requested power state for the link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

Figure 6:
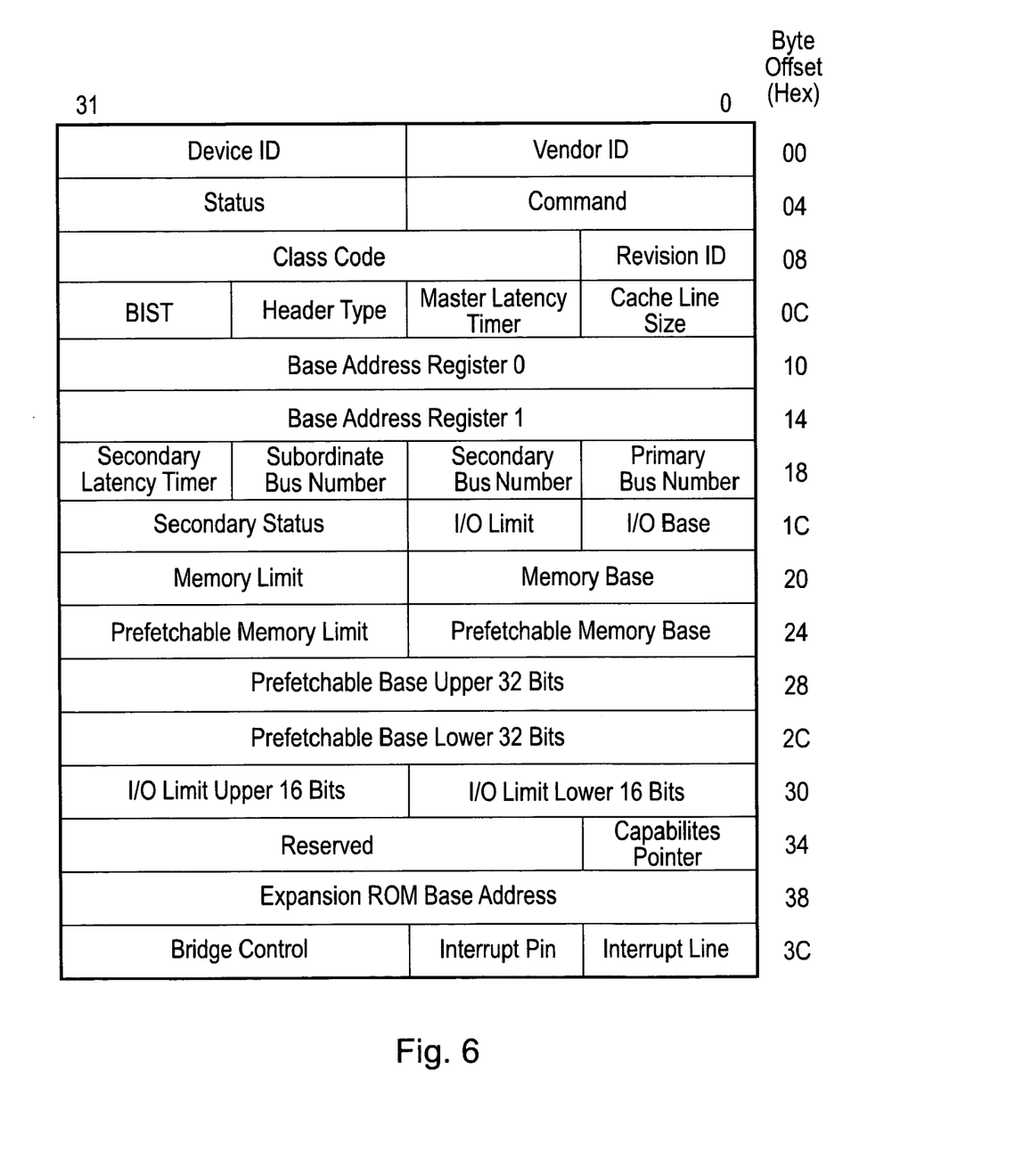
FIG. 6 is a schematic structure overview for a Type 1 configuration header.
Figure 7:
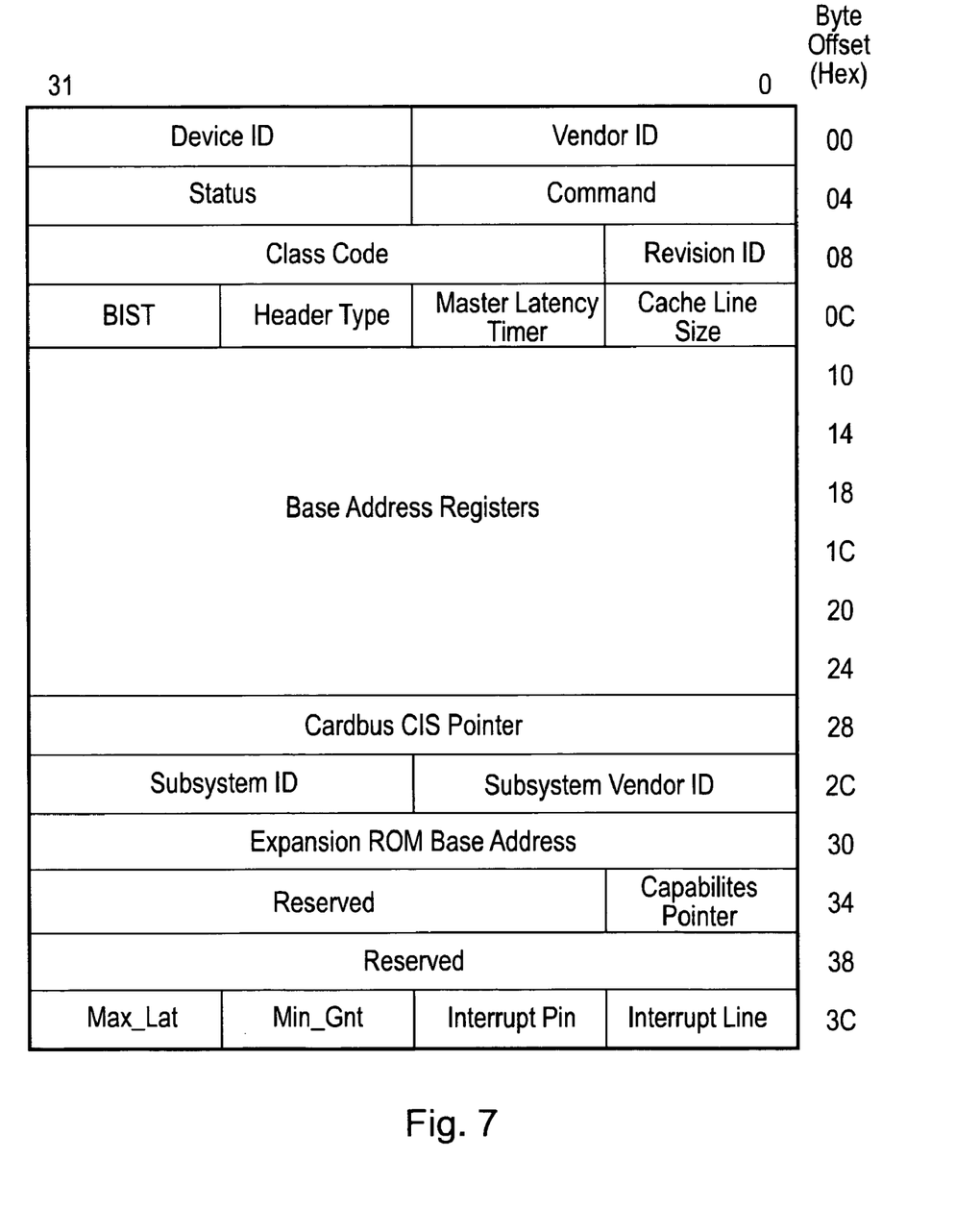
FIG. 7 is a schematic structure overview for a Type 0 configuration header.

As described above, a PCI Express switch provides a single upstream port and one or more downstream ports. Configuration of the ports can be carried out using the PCI Express configuration space headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P). Each P2P bridge is identified through the class code register in the Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (Bus Device Function number). Each transaction layer packet which is transferred over the fabric includes a Requester ID field which is equal to the BDF of the requester of a transaction. In some cases, the packet may also include a Completer ID, which is the BDF of the completer of the transaction. The value of the Type 0/1 headers may be transmitted as payload to a transaction layer packet request or completion. The BDF is a 16-bit field composed of a bus number (8-bit, BN), a device number (5-bit, DN) and a function number (3-bit, FN). After the bus-walk is complete, the system platform performs bus enumeration by conducting a series of configuration write requests which include values which reflect the Type 0/1 headers within the payload to each device in the PCI Express hierarchy. This process assigns each device with a unique bus number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the configuration requests used by the host platform/root complex to enumerate the bus contain the values of the Type 1 header in its payload field. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (status and command), which is the command and status register which provides status and control over the PCI Express interface. The class code field is used to define the type of device, as indicated above the P2P bridge is identified by a class code of 0x060400. The Type 1 header also has fields to identify the primary and secondary bus numbers of the P2P, and fields for BARs, and base/limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of {BN=virtual PCI Bus (2 in FIG. 3), DN=actual port/device, FN=0}.

Also, respective ports may have respective secondary bus numbers, e.g. PORT 1 may have secondary bus number 3 (00000011), PORT 2 may have secondary bus number 4 (00000100), and PORT 3 may have secondary bus number 5 (00000101). Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (defined by a Base Address Register, or BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the BAR of PORT 3 may have a base of x0400 and a limit of x04FF. Thus the BAR of PORT 0 must have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

Figure 8:
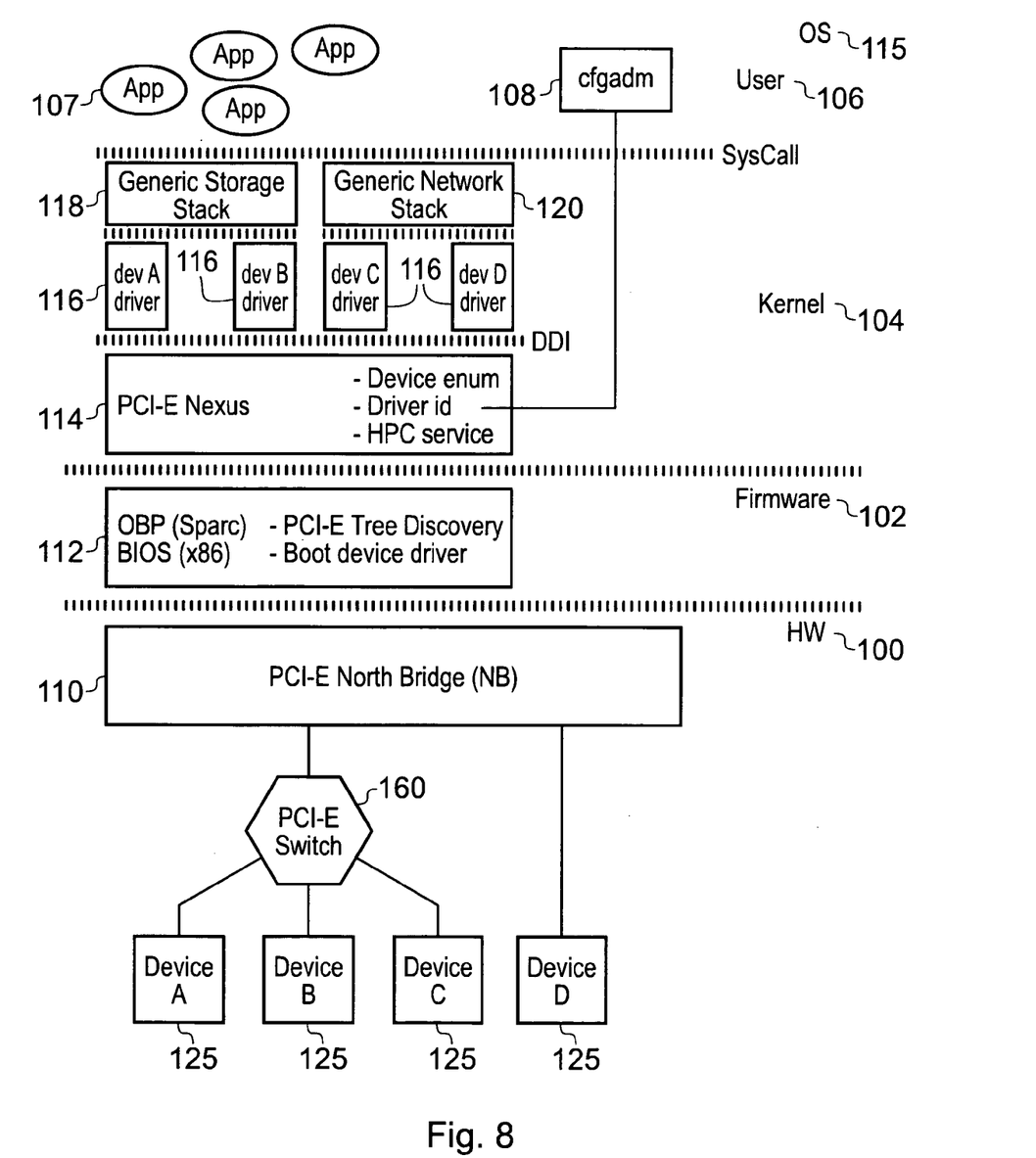
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows OS, a Linux OS, etc.

The switch 160 illustrated in FIG. 8 forms an example of an interconnect apparatus that could be implemented in one or more integrated circuits. An example of such an integrated circuit could be an application specific integrated circuit (ASIC). In such an interconnect apparatus, there is a need to provide buffers for the temporary storage of information.

In the following, with reference to FIGS. 9 to 11, there will now be described examples of an interconnect apparatus that includes a buffer mechanism that can be implemented in an efficient manner for accommodating normal operating conditions while still being able to accommodate special situations for which additional buffer capacity is advantageous.

Figure 9:
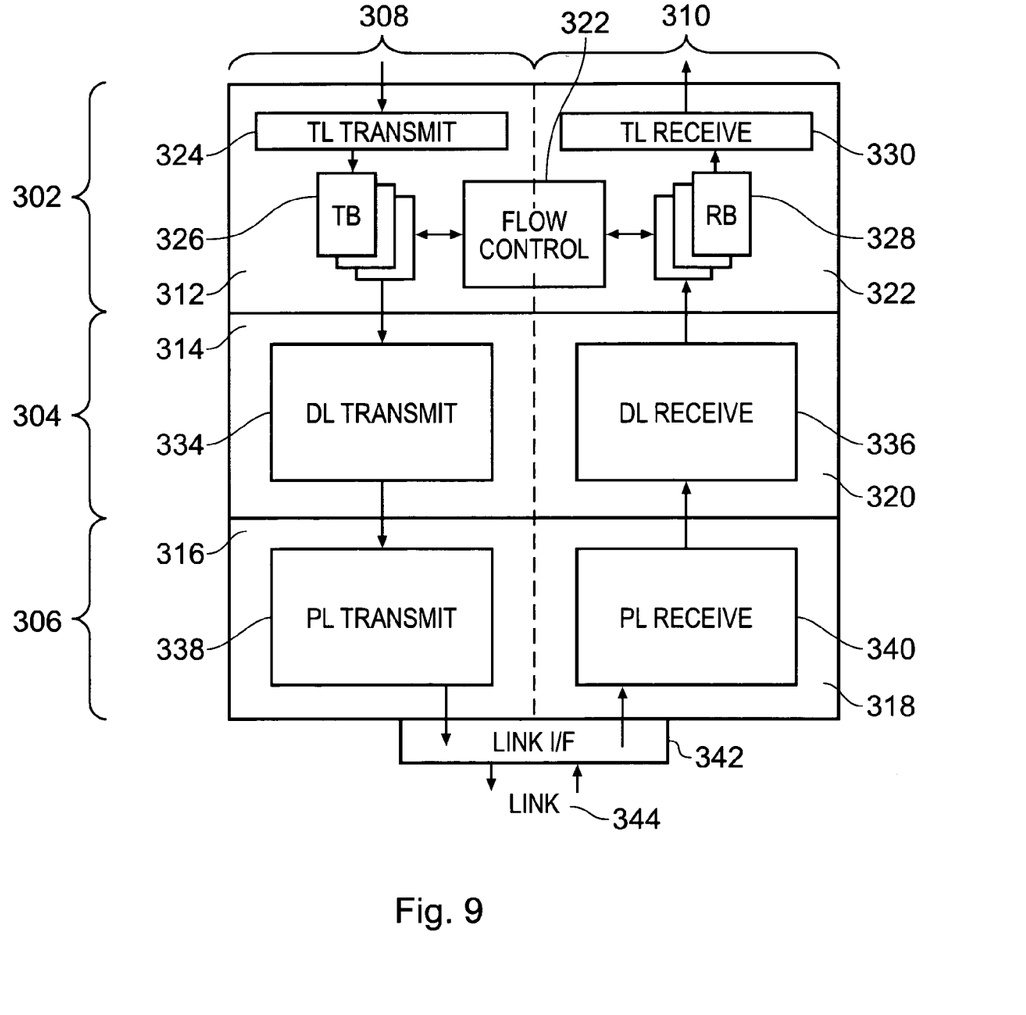
FIG. 9 is a schematic block diagram of a data link transmitter/receiver.

FIG. 9 provides a schematic overview of the device layers within a port of such an interconnect apparatus (for example for a port such as the ports 0, 1, 2 and 3 illustrated in FIG. 2).

As represented in FIG. 9, the port includes three basic layers, including a transaction layer 302, a data link layer 304 and a physical layer 306. The physical layer 306 interfaces via a link interface 342 to a physical link 344. Within the various layers, the logic is configured to form a transmit side 308 and a receive side 310.

Within the transmit side 308, there is therefore a transaction layer transmit portion 312, a data link layer transmit portion 314 and a physical layer transmit portion 316. On the receive side 310, there is a physical layer receive portion 318, a data link layer receive portion 320 and a transaction layer receive portion 322.

When a message is to be sent via the link 344, the information concerned is received by transaction layer transmit logic 324 in the transaction layer transmit portion 312, and is buffered in transaction buffers 326. The data from the transaction buffers 326 is processed in the data link layer transmit logic 334 in the data link layer transmit portion 314 before being passed to physical layer transmit logic 338 in the physical layer transmit portion 316. The data processed by the physical layer transmit logic 338 is passed via the link interface 342 to the link 344. The link interface 342 includes a serializer/deserializer (SERDES) for the port.

When data is received from the link 344, it is passed by the link interface 342 to physical layer receive logic 340 in the physical layer receive portion 318. This data is then passed to the data link layer receive logic 336 in the data link layer receive portion 320. After processing by the data link layer receive logic 336, the received information is passed to the receive buffers 328 in the transaction layer receive portion 322, and is then processed by the transaction layer receive logic 330.

Flow control logic 332 in the transaction layer 302 is operable to prevent a transaction layer packet being transmitted over the link to a remote receiver device unless the receiver device has appropriate buffer space (termed credit) to accept TLPs of a given traffic class. Flow control is automatically managed and is transparent to software.

When using a protocol such as PCI Express, it is usual to employ transactions based on packets to accomplish data transfer between devices. For example, a root complex can communicate with an end point and an end point can communicate with a root complex. An end point can also communicate with other end points. In the case of PCI Express, communication involves the transmission and reception of packets called transmission layer packets (TLPs) referenced in the earlier description.

The TLPs include various categories, or types. In the case of PCI Express, these types can include, for example, non-posted transactions, posted transactions and completion transactions.

For non-posted transactions, a requester transmits a TLP request packet to a completer. At a later time, the completer returns a TLP completion packet back to the requester. Non-posted transactions are handled as split transactions. The purpose of the completion TLP is to confirm to the requester that the completer has received the request TLP. Non-posted read transactions contain data in the completion TLP. Non-posted write transactions contain data in the write request TLP.

For posted transactions, a requester transmits a TLP request packet to a completer. The completer however does not return a completion TLP back to the requester. Posted transactions are therefore optimized for the best performance in completing the transaction at the expense of the requester not having knowledge of successful reception of the request by the completer. Posted transactions can sometimes contain data in the request TLP and sometimes not.

In order to provide efficient processing of the transaction packets of the various types described above, it is desirable to provide separate buffers for each of the different types of transactions.

Figure 10:
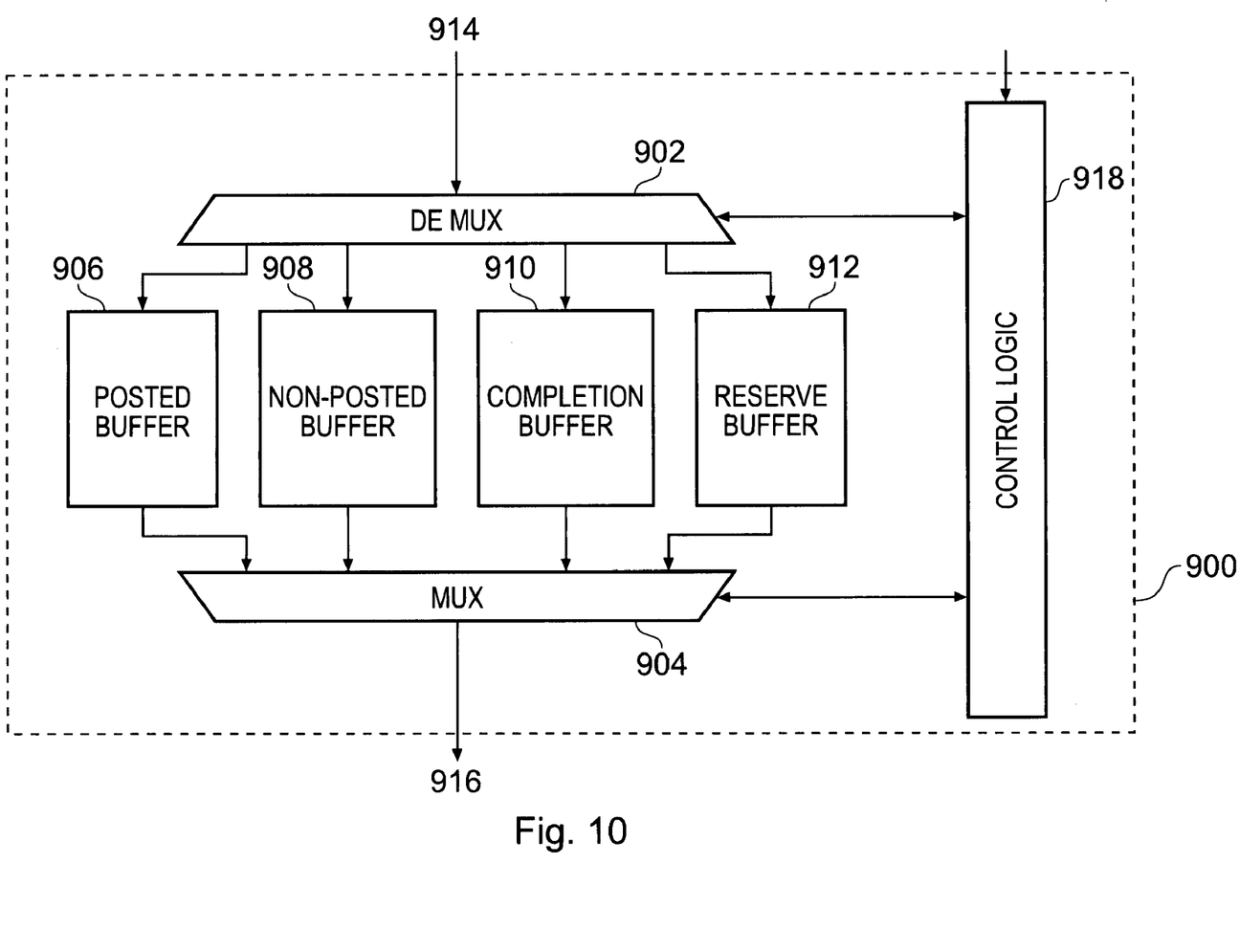
FIG. 10 is a schematic block diagram of a transaction buffer mechanism in a non-streaming condition.

FIG. 10 is a schematic block diagram of a transaction buffer mechanism 900, which provides separate buffers 906, 908 and 910 for posted transactions, non-posted transactions and completion transactions, respectively. The transaction buffer mechanism 900 can, for example, implement the buffers 326 and/or 328 in the transaction layer 302 of the port structure shown in FIG. 9. The buffer mechanism 900 illustrated in FIG. 10 could be provided in the transmit side 312, for example to implement the buffers 326, or in the receive side 322, for example to implement the buffers 328, or both, of FIG. 9.

The buffer mechanism 900 can be implemented on an integrated circuit, for example as part of a port in an interconnect apparatus such as a switch component. In a port as illustrated in FIG. 9, respective buffer mechanisms can, for example, be provided for each host complex to which the switch is to be connected. The provision of the three separate buffers 906, 908 and 910 can involve a significant amount of integrated circuit real estate. Accordingly, it is desirable to optimize the size of each of those buffers 906, 908 and 910.

As illustrated in FIG. 10, in addition to the buffers 906, 908 and 910, a reserve buffer 912 is provided. The reserve buffer 912 can be allocated dynamically to increase the capacity of one of the posted buffer 906, the non-posted buffer 908 or the completion buffer 910, at a given time. Accordingly, when assessing the size required for the posted buffer 906, the non-posted buffer 908 and the completion buffer 910, account can be taken that the size of that buffer can be increased, where required, through the use of storage capacity from the reserve buffer 912.

In operation, control logic 918 is operable to control the distribution of transaction packets received at 914 by the demultiplexer 902 into the posted buffer 906, the non-posted buffer 908, or the completion buffer 910, according to the type of transaction received. The control logic 918 is also operable to control the output of the buffer to transaction packets from the posted buffer 906, the non-posted buffer 908 and the completion buffer 910 to the output from the buffer mechanism 916. Where the control logic 918 detects a particular situation requiring additional storage capacity for the respective buffers 906, 908 and 910, and where the control logic determines that the individual capacity of one of those buffers is used up, then any additional packets received for that buffer can then be stored in the reserve buffer 912.

Figure 11:
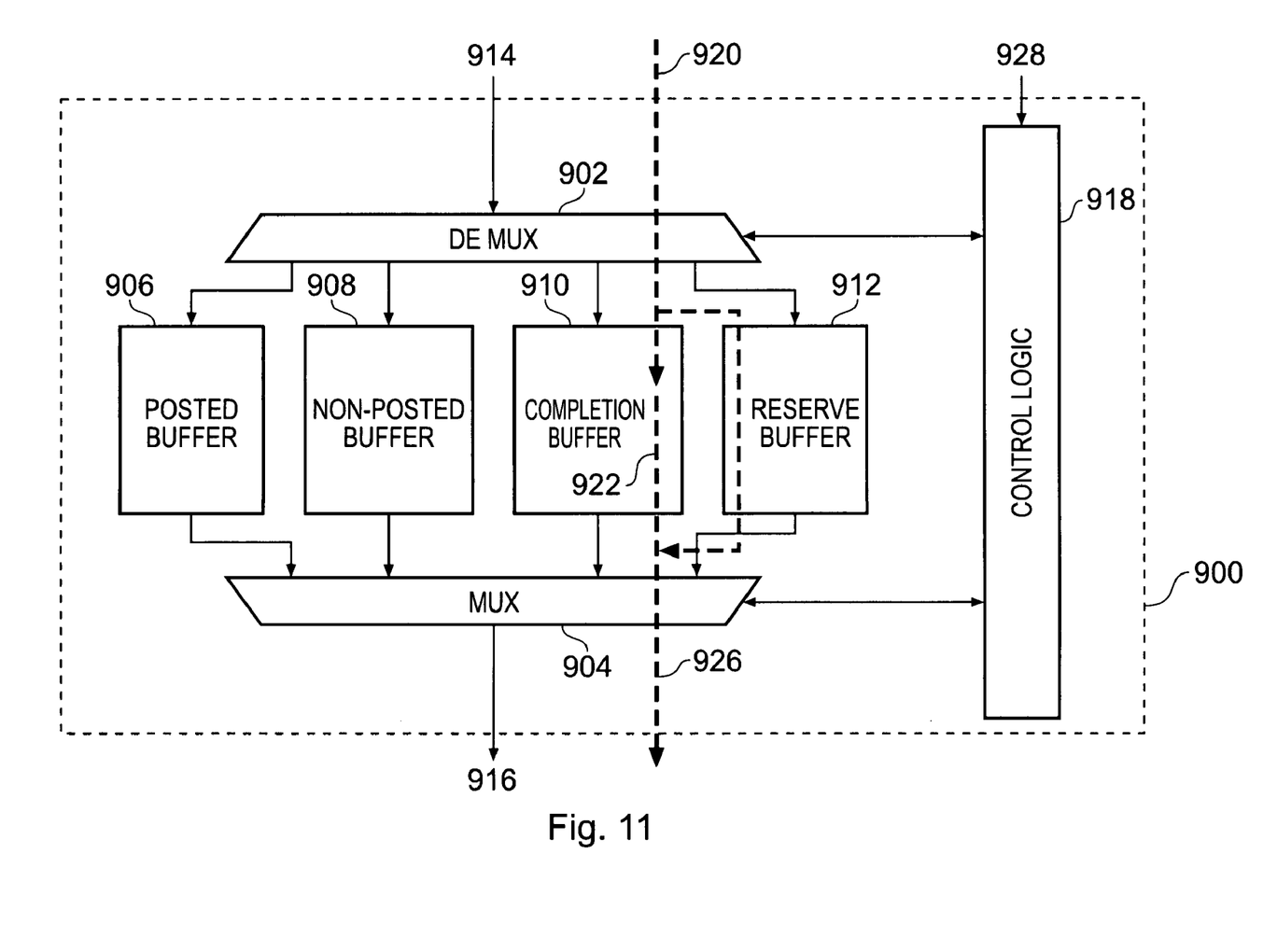
FIG. 11 is a schematic block diagram of a transaction buffer mechanism in a streaming condition.

FIG. 11 illustrates an example of operation where a streaming condition has been detected for completion packets. Specifically, the control logic 918 is operable to detect a streaming condition for one of the posted, non-posted and completion packets and, in response thereto, to allocate the reserve buffer to the appropriate buffer for that type of packet. For example, the control logic 918 may receive a signal at 928 indicating a streaming condition for completion packets. Alternatively, the control logic 918 may be operable to monitor the flow of packets through the demultiplexer 914, and to detect that the streaming condition is in operation.

When the control logic 918 determines a streaming condition for a given type of packet (for example, for completion packets in FIG. 11), the control logic will be operable to allocate the reserve buffer 912 to the appropriate buffer (i.e. completion buffer 910 in FIG. 11).

The control logic can then be operable to control the demultiplexer 902, such that completion packets received in the stream 920 are buffered (path 922) in the completion buffer until the completion buffer is full. Further received completion packets can then be buffered (path 924) in the reserve buffer 912. When outputting packets from the completion buffer 910 and the reserve buffer 912, the packets from the respective buffers can be merged by the multiplexer 904 into an output stream 926.

The control logic 918 can be operable to deallocate the reserve buffer 912 when the streaming condition ceases.

Figure 12:
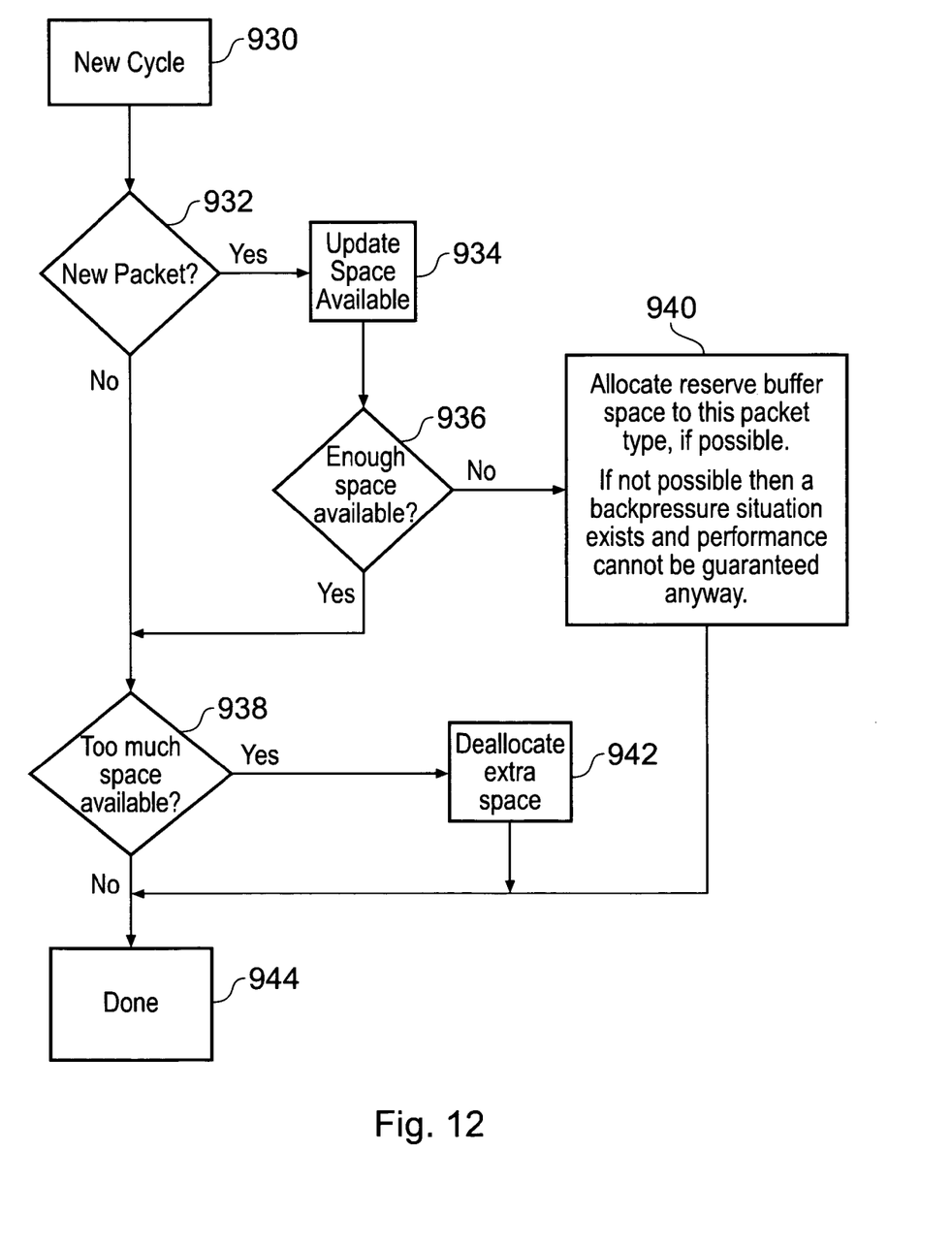
FIG. 12 is a flow diagram illustrating the operation of the transaction buffer mechanism of FIGS. 10 and 11.

FIG. 12 is a flow diagram illustrating the operation of the control logic 918 of the buffer mechanism 900 of FIG. 10.

At 930, a new cycle commences.

If, at 932, a new packet is received, at 934, the amount of available space is updated.

If, at 936, it is determined that there is not enough space available, then at 940, the reserve buffer space is allocated to this packet type, if possible. If it is not possible, then a back pressure situation exists, and, in this case, performance is not guaranteed.

At 944, this new cycle is complete.

If, at 932, a new packet has not been received, or, if at 936 it is determined that enough space was available, then at 938, it is determined whether too much space is available. If, at 938, it is determined that too much space is available, then at 942 the extra space from the reserve buffer 912 is deallocated and the cycle completes at 944.

If, at 938, it is determined that there was not too much space available, then the cycle is complete at 944.

As described in the above embodiment, the reserve buffer 912 can be allocated to one, only, of the posted buffer 906, the non-posted buffer 908, or the completion buffer 910 at any one time.

However, in an alternative example, a buffer space in the reserve buffer 912 could be partitioned and allocated as required to two, or possibly three of the buffers 906, 908 and 910. In this case, the buffer space provided by the reserve buffer would be configured to be less than the total buffer space required if each of the posted buffer 906, the non-posted buffer 908 and the completion buffer 910 were configured to fully accommodate a streaming packet situation.

The individual buffers 906, 908, 910 and 912 could be configured as separate hardware buffers in an integrated circuit, or could relate to portions of generally allocateable buffer space in the integrated circuit.

Although, in the example described above, buffers for three types of packets are described, in another example another number of buffers could be provided, depending on the types of information to be buffered.

Accordingly, there has been described an interconnect apparatus that provides for the buffering of information in respective transaction buffers according to transaction type. An additional buffer is dynamically assignable to one, or more, of the transaction buffers, where additional capacity is required by that transaction buffer.

In an example embodiment, only a part of the total buffer space available is pre-allocated to respective transaction types, and the remainder of the total buffer space is kept in reserve for allocation according to needs. In this manner, split buffer resources (for example, between posted, non-posted and completion packet types) can be configured to provide optimum performance when streaming packets through a buffer, without requiring each of the separate buffer resources to be sized to provide such optimum performance. This example takes account of the fact that, in practical applications, only one of the packet types will be under stress at any given time, and a large proportion of the total buffer space would otherwise be sitting idle and unused. Without the use of a reserve buffer as described in FIG. 10, the total buffer space would be much larger than would actually be needed to maintain high performance when streaming.

Accordingly, the nominal buffer size for each of the separate buffers allocated to the respective buffer types does not need to be large enough to support streaming of the packets. When a streaming condition is detected, the reserve buffer space is dynamically allocated to the buffer that is under stress and no performance is lost. This allows a reduction in the overall buffer requirement of the design with no consequent drop in performance.

In order to address requirements where buffer sizes are to be announced at initialization, and no provision is made for resizing buffers during operation, the reserve buffer space can be hidden from external devices. The allocation of the reserve buffer space can be handled internally by the control logic 918, and external devices will see the allocation of reserve buffer space as a release of credit rather than an increase in buffer size. When high volume streaming traffic ceases, the advertised buffer sizes will be the same as before the traffic began.

As described above, an interconnect apparatus, for example a switch or a portion thereof, could be implemented in an integrated circuit. An example of such an integrated circuit could be an application specific integrated circuit (ASIC). Such an interconnect apparatus could form part of a system, for example an interconnect system and/or a computer system. It will be appreciated, however, that a buffer mechanism as described above could be employed in other types of devices and/or apparatus.

Although the present examples are based on PCI Express, it will be appreciated that they are by way of example only, and that embodiments of this invention can be implemented in other architectures and under different standards than the PCI Express standard.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. An interconnect apparatus comprising a transaction buffer mechanism including a plurality of transaction buffers, each transaction buffer being operable to buffer transaction packets of a respective type, and a reserve buffer shared between the plurality of transaction buffers, wherein when a transaction buffer is full of buffered transaction packets or when the transaction buffer is not full of buffered transaction packets but the transaction buffer mechanism determines that the transaction buffer may become full of buffered transaction packets, the transaction buffer mechanism is configured to dynamically assign the reserve buffer to the full transaction buffer to store subsequently arriving transaction packets for the full transaction buffer.

2. The interconnect apparatus of claim 1, wherein one transaction buffer is operable to buffer posted transaction packets.

3. The interconnect apparatus of claim 1, wherein one transaction buffer is operable to buffer non-posted transaction packets.

4. The interconnect apparatus of claim 1, wherein one transaction buffer is operable to buffer completion transaction packets.

5. The interconnect apparatus of claim 1, wherein each transaction buffer has a size insufficient to support streaming of packets, but wherein a combination of the capacity of a transaction buffer and the reserve buffer when assigned thereto is sufficient to support packet streaming.

6. The interconnect apparatus of claim 1, comprising control logic for allocating the reserve buffer to a transaction buffer where additional capacity is required by that transaction buffer.

7. The interconnect apparatus of claim 1, comprising control logic for allocating the reserve buffer to a transaction buffer in response to detecting a packet streaming condition.

8. The interconnect apparatus of claim 1, wherein the control logic is configured to report the allocation of the reserve buffer to a transaction buffer as a release of credit for that transaction buffer.

9. The interconnect apparatus of claim 1, operable under a PCI Express protocol.

10. The interconnect apparatus of claim 1, wherein the interconnect apparatus comprises a switch.

11. The interconnect apparatus of claim 1 in the form of an integrated circuit.

12. A computer system comprising a transaction buffer mechanism including a plurality of transaction buffers, each transaction buffer being operable to buffer transaction packets of a respective type, and a reserve buffer shared between the plurality of transaction buffers, wherein when a transaction buffer is full of buffered transaction packets or when the transaction buffer is not full of buffered transaction packets but the transaction buffer mechanism determines that the transaction buffer may become full of buffered transaction packets, the transaction buffer mechanism is configured to dynamically assign the reserve buffer to the full transaction buffer to store subsequently arriving transaction packets for the full transaction buffer.

13. A method of operating an interconnect apparatus comprising a transaction buffer mechanism including a plurality of transaction buffers, the method comprising each transaction buffer buffering transaction packets of a respective type, and when a transaction buffer is full of buffered transaction packets or when the transaction buffer is not full of buffered transaction packets but the transaction buffer may become full of buffered transaction packets, dynamically assigning a reserve buffer that is shared among the transaction buffers to the full transaction buffer to store subsequently arriving transaction packets for the full transaction buffer.

14. The method of claim 13, wherein posted transactions are buffered in a first transaction buffer, non-posted transaction packets are buffered in a second transaction buffer, and completed transaction packets are buffered in a third transaction buffer.

15. The method of claim 13, wherein each transaction buffer has a size insufficient to support streaming of packets, but wherein a combination of the capacity of a transaction buffer and the reserve buffer when assigned thereto is sufficient to support packet streaming.

16. The method of claim 13, wherein the reserve buffer is allocated to a transaction buffer in response to detecting a packet streaming condition.

17. The method of claim 13, wherein the allocation of the reserve buffer to a transaction buffer appears to external devices as a release of credit for that transaction buffer.

18. The method of claim 13, operable under a PCI Express protocol.

* * * * *